(12) United States Patent
Lyzen et al.

(10) Patent No.: US 12,530,028 B2
(45) Date of Patent: Jan. 20, 2026

(54) POWER EQUIPMENT DEVICE WITH DRIVER-ASSISTED SEMI-AUTONOMOUS OPERATION

(71) Applicant: MTD PRODUCTS INC, Valley City, OH (US)

(72) Inventors: Zachary A. Lyzen, Seattle, WA (US); Adam J. Woodrum, Wakeman, OH (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 17/503,958

(22) Filed: Oct. 18, 2021

(65) Prior Publication Data

US 2022/0121202 A1  Apr. 21, 2022

Related U.S. Application Data

(60) Provisional application No. 63/092,892, filed on Oct. 16, 2020.

(51) Int. Cl.
*G05D 1/00* (2024.01)
(52) U.S. Cl.
CPC ......... *G05D 1/0088* (2013.01); *G05D 1/0278* (2013.01)
(58) Field of Classification Search
CPC ...... G05D 1/0088; G05D 1/0278; G05D 1/00; A01D 41/1278; A01D 78/1042; A01D 33/12; A01D 34/10; A01D 34/00; A01D 34/001; A01D 34/008; A01D 34/40;
(Continued)

(56) References Cited

U.S. PATENT DOCUMENTS

| 4,200,166 A | * | 4/1980 | Hansen | B66F 9/20 |
| | | | | 180/315 |
| 4,244,623 A | * | 1/1981 | Hall | A47C 1/03 |
| | | | | 297/162 |

(Continued)

FOREIGN PATENT DOCUMENTS

EP  1964458 A1  9/2008

OTHER PUBLICATIONS

International Search Report and Written Opinion for International Application No. PCT/US2021/055421 dated Jan. 20, 2022, 14 pages long.

*Primary Examiner* — Logan M Kraft
*Assistant Examiner* — Anthony Donald Taylor, Jr.
(74) *Attorney, Agent, or Firm* — Wegman Hessler Valore

(57) ABSTRACT

A power equipment machine with operator selectable autonomous mode and manual mode is provided. By way of example, the power equipment device can provide user-assisted semi-autonomous steering along user-defined paths of a geographic area. Manual steering controls and autonomous guidance controls can be positioned on one or more movable armrests to enhance comfort and minimize operator fatigue. The manual steering controls can include a jog wheel and encoder mechanism located on a first armrest, eliminating conventional mechanical shaft and wheel steering devices and dual lap bar steering devices. Guidance and computer settings can be accessed through a touchscreen display mounted in front of an operator position on the power equipment device.

13 Claims, 13 Drawing Sheets

(58) Field of Classification Search
CPC .......... B60W 60/001; B60W 60/0013; B60W 60/0015; B60W 60/0025; B60W 60/005
USPC ........................................................ 180/12
See application file for complete search history.

(56) References Cited

U.S. PATENT DOCUMENTS

| | | | | |
|---|---|---|---|---|
| 4,478,308 A * | 10/1984 | Klaassen | ............... | E02F 9/2004 180/326 |
| 4,674,790 A * | 6/1987 | Johnson | ................... | B60N 2/77 296/64 |
| 5,086,870 A * | 2/1992 | Bolduc | ................. | B60W 30/18 180/336 |
| 5,307,612 A * | 5/1994 | Tomiyama | ............. | A01D 34/68 56/11.1 |
| 5,337,543 A * | 8/1994 | Kitamura | ............... | A01D 34/68 56/10.8 |
| 5,355,661 A * | 10/1994 | Tomiyama | ........... | B62D 11/183 56/11.1 |
| 5,502,957 A * | 4/1996 | Robertson | .......... | A01D 34/6806 56/10.2 G |
| 5,702,157 A * | 12/1997 | Hurite | ................... | B60N 2/767 297/411.32 |
| 6,050,645 A * | 4/2000 | Bradbury | ............... | B60N 2/763 297/411.32 |
| 6,164,285 A * | 12/2000 | Garberg | ................. | B60K 26/00 180/326 |
| 6,804,587 B1 * | 10/2004 | O Connor | ............... | E02F 9/205 701/50 |
| 7,290,635 B2 * | 11/2007 | Bisick | ................... | B60N 2/797 180/326 |
| 7,540,134 B1 * | 6/2009 | Reich | ..................... | A01D 34/74 56/14.9 |
| 7,635,045 B2 * | 12/2009 | Shearer | ................ | E02F 9/2004 180/315 |
| 7,797,918 B2 * | 9/2010 | Drake | ................... | A01D 34/82 180/315 |
| 8,388,262 B2 * | 3/2013 | Klein | ..................... | B60N 2/797 404/83 |
| 8,522,901 B1 * | 9/2013 | VanLue | ................. | B62D 11/04 56/15.8 |
| 9,021,914 B1 * | 5/2015 | Newcomb | ............ | F16H 63/067 74/481 |
| 9,352,673 B2 * | 5/2016 | Yasunobe | ............... | B60N 2/753 |
| 9,448,561 B2 * | 9/2016 | Fujimoto | ............. | G05D 1/0278 |
| 9,462,746 B1 * | 10/2016 | Gerhardson | ......... | A01D 34/006 |
| 9,538,706 B2 * | 1/2017 | Haun | ....................... | B62D 1/12 |
| 10,822,031 B2 * | 11/2020 | Dix | ...................... | B62D 15/029 |
| 10,836,426 B1 * | 11/2020 | Busboom | .............. | B62D 11/04 |
| 11,345,384 B2 * | 5/2022 | Ries | ......................... | B62D 1/02 |
| 2004/0221561 A1 * | 11/2004 | Koehn | ................... | A01D 34/74 56/15.9 |
| 2005/0072619 A1 * | 4/2005 | Amamiya | ................ | G05G 1/62 180/315 |
| 2006/0172857 A1 * | 8/2006 | Eavenson | ............ | B62D 11/006 477/203 |
| 2006/0229770 A1 * | 10/2006 | Strong | ............... | B62D 33/0617 701/1 |
| 2007/0095040 A1 * | 5/2007 | Berkeley | ................ | A01D 34/82 56/10.8 |
| 2008/0215203 A1 * | 9/2008 | Dix | ....................... | G05D 1/0219 701/26 |
| 2013/0041549 A1 * | 2/2013 | Reeve | .................... | G05D 1/0278 701/28 |
| 2014/0262560 A1 * | 9/2014 | Dwyer | ..................... | B60Q 9/00 56/320.1 |
| 2014/0277899 A1 * | 9/2014 | Matsuzaki | ........... | G05D 1/0295 701/25 |
| 2016/0052546 A1 * | 2/2016 | Arakane | ................ | G05D 1/027 701/41 |
| 2016/0366815 A1 * | 12/2016 | Guyette | ............. | G01C 21/165 |
| 2017/0177002 A1 * | 6/2017 | Ogura | .................. | A01B 69/008 |
| 2018/0210440 A1 * | 7/2018 | Matsuzaki | ........... | G05D 1/0027 |
| 2019/0101931 A1 * | 4/2019 | Ogura | .................. | G05D 1/0278 |
| 2019/0146513 A1 * | 5/2019 | Tomita | .................. | B60W 30/10 701/50 |
| 2020/0022303 A1 * | 1/2020 | Gindt | ................... | A01D 34/824 |
| 2020/0064144 A1 * | 2/2020 | Tomita | .................... | B62D 6/00 |
| 2020/0064863 A1 * | 2/2020 | Tomita | .................. | A01B 69/00 |
| 2020/0331347 A1 * | 10/2020 | Sakaguchi | ......... | A01D 41/1217 |
| 2021/0325887 A1 * | 10/2021 | Zhu | ....................... | B62D 5/0457 |
| 2021/0371261 A1 * | 12/2021 | Yasukochi | .......... | B66F 9/07568 |
| 2021/0404812 A1 * | 12/2021 | Yuasa | ..................... | A01B 37/00 |

* cited by examiner

POWER EQUIPMENT DEVICE WITH DRIVER-ASSISTED SEMI-AUTONOMOUS OPERATION

CROSS-REFERENCE TO RELATED APPLICATION

The present application for patent is a non-provisional application that claims the benefit of U.S. Provisional Patent Application No. 63/092,892 filed Oct. 16, 2020 and titled "POWER EQUIPMENT DEVICE WITH DRIVER-ASSISTED SEMI-AUTONOMOUS OPERATION", which is hereby incorporated by reference herein in its entirety and for all purposes.

INCORPORATION BY REFERENCE

The following are hereby incorporated by reference within the present disclosure in their respective entireties and for all purposes: U.S. patent application Ser. No. 17/016,022 filed Sep. 9, 2020; U.S. Pat. No. 9,409,596 issued Aug. 9, 2016; and U.S. Pat. No. 9,944,316 issued Apr. 17, 2018.

FIELD OF DISCLOSURE

The disclosed subject matter pertains to apparatuses and methods for semi-autonomous steering control for power equipment, for instance, utilizing position location data and a calculated drive path for semi-autonomous steering of a power equipment device.

BACKGROUND

Manufacturers of power equipment for outdoor maintenance applications offer many types of machines for general maintenance and mowing applications. Generally, these machines can have a variety of forms depending on application, from general urban or suburban lawn maintenance, rural farm and field maintenance, to specialty applications. Even specialty applications can vary significantly, from sporting events requiring moderately precise turf, such as soccer fields or baseball outfields, to events requiring very high-precision surfaces such as golf course greens, tennis courts and the like.

Automated vehicle technology has been introduced in test environments in recent years. Many manufacturers have engaged in the effort to produce a reliable, automated driving car and truck. While road vehicles have particular challenges, including differing types of roads and the variance in vehicle density typically observed for the different types of roads, extension of automated driving technology to off-road equipment often presents different challenges. Operator assist systems, for instance, are one category of emerging technologies that are becoming more prevalent for partial automation of off-road vehicle equipment.

BRIEF SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

Disclosed in various embodiments provided herein is an apparatus for providing semi-autonomous steering for a power equipment device. As an example, one or more embodiments include user-assisted steering automation to maintain parallel pathing for the power equipment device. Path vectors can be generated and position location data utilized to identify deviations in position of the power equipment device from a current path. Steering adjustment data is generated and provided to an automated steering control unit to correct the deviations in position from the current path, in effect steering the power equipment device along the current path. The position location data can be acquired at a suitable frequency to minimize deviation from a calculated path at speeds commonly employed by the power equipment device.

Further embodiments of the present disclosure provide arm-rest mounted operator controls for a power equipment device. In an embodiment, steering controls for operator manual steering of the power equipment device can be located on one (or more) of the armrests of the power equipment device. In another embodiment, automated steering controls can be provided on one (or more) of the armrests of the power equipment device. In still further embodiments, the armrests can be at least in part movable from a first position to a second position. The first position can be an open position configured to enable operator entrance to and egress from an operator's operating position (e.g., a driver seat, an operator platform, or the like). The second position can be a closed position configured to bring the manual and automated steering controls to the operator's hands when positioned in the operating position, and optionally can help to secure the operator within the operating position. The second position can in part be adjustable to control the second position relative to the operator's operating position.

In alternative or additional embodiments, a subset of disclosed armrest mounted controls can be provided on an ergonomic surface. The ergonomic surface can be conformal to a human hand for operator comfort. In some embodiments, user inputs for the armrest mounted controls (e.g., button(s), switch(es), slider(s), dial(s), etc.) can be positioned at a portion of the ergonomic surface facing a thumb portion of the ergonomic surface. One or more user outputs for the armrest mounted controls (e.g., light(s), indicator(s), auditory, tactical, and so forth) can be positioned at the thumb portion of the ergonomic surface, for ease-of-view or perception.

In yet another embodiment(s), a display screen is secured and connected in front of an operator's operating position. The display screen can be configured to provide a user input/output interface for computer and electronic controls of the power equipment device. Such controls can include defining a geographic boundary(ies) to be traversed by the power equipment device and setting operational parameters for the power equipment device (e.g., autonomous device speed, turning speed, turning path definition, path overlap, path spacing, and so forth), storing a geographic boundary(ies) definition for subsequent application, defining striping pattern and orientation, storing striping patterns, power equipment and geographic maintenance settings, and the like, and combinations thereof).

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

Figure 1:
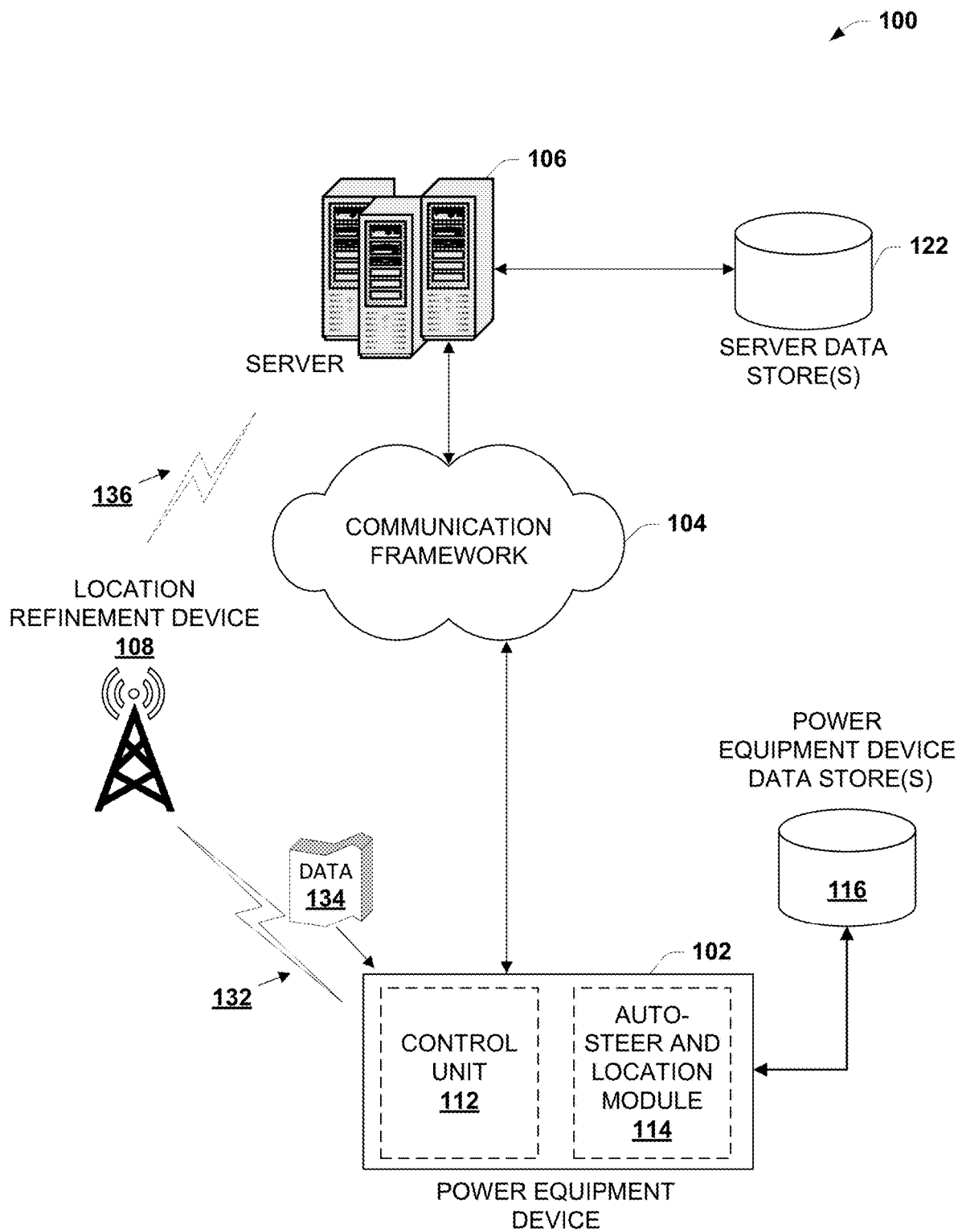
FIG. 1 depicts a block diagram of an example system that provides user-assisted automated steering for a power equipment device, in disclosed embodiments.

It should be noted that the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

While embodiments of the disclosure pertaining to machine vision systems for power equipment machines are described herein, it should be understood that the disclosed machines, electronic and computing devices and methods are not so limited and modifications may be made without departing from the scope of the present disclosure. The scope of the systems, methods, and electronic and computing devices for machine vision devices are defined by the appended claims, and all devices, processes, and methods that come within the meaning of the claims, either literally or by equivalence, are intended to be embraced therein.

DETAILED DESCRIPTION

The following terms are used throughout the description, the definitions of which are provided herein to assist in understanding various aspects of the subject disclosure.

As used in this application, the terms "outdoor power equipment", "outdoor power equipment machine", "power equipment", "maintenance machine" and "power equipment machine" are used interchangeably and are intended to refer to any of robotic, partially robotic ride-on, walk-behind, sulky equipped, autonomous, semi-autonomous (e.g., user-assisted automation), remote control, or multi-function variants of any of the following: powered carts and wheel barrows, lawn mowers, lawn and garden tractors, lawn trimmers, lawn edgers, lawn and leaf blowers or sweepers, hedge trimmers, pruners, loppers, chainsaws, rakes, pole saws, tillers, cultivators, aerators, log splitters, post hole diggers, trenchers, stump grinders, snow throwers (or any other snow or ice cleaning or clearing implements), lawn, wood and leaf shredders and chippers, lawn and/or leaf vacuums, pressure washers, lawn equipment, garden equipment, driveway sprayers and spreaders, and sports field marking equipment.

FIG. 1 illustrates a diagram of an example communication environment 100 for providing position location data for a power equipment device 102, according to one or more embodiments of the present disclosure. Power equipment device 102 can include any suitable power equipment device disclosed herein or known in the art, such as one or more power equipment device(s) listed previously. Power equipment device 102 can be equipped with a data communication interface to communicate electronically by way of a communication framework 104, to one or more server devices 106. Server devices 106 provide position location data to power equipment device 102. The position location data can be stored at a power equipment device data store(s) 116, in an embodiment. In further embodiments, steering and location processes stored in power equipment device data store(s) 116 can be activated by an auto-steer and location module 114, and can utilize the position location data to provide user-assisted steering functionality for power equipment device 102, as described herein.

Communication between power equipment device 102 and server devices 106 can utilize any suitable mechanism known in the art or reasonably suggested to one of ordinary skill in the art by way of the context provided herein together with the knowledge of, or attributable to, such a person. One possible communication between power equipment device 102 and server devices 106 can be in the form of a data packet adapted to be transmitted between two or more computer processes by way of communication framework 104. Auto-steer and location module 114 can establish a connection with server device(s) 106, and can retrieve data, store data, submit processing requests, provide data in conjunction with a processing request, and the like, utilizing data packets or other suitable form of wireless communication.

Communication framework 104 can be employed to facilitate communications between power equipment device 102 (or components thereof) and server devices 106. Communication framework 108 will generally be a wide area network in most disclosed embodiments, although the subject disclosure is not limited by these embodiments. Rather, in various embodiments communication framework 104 can include wired/wireless connectivity to a local area network (LAN) or larger networks, e.g., a wide area network (WAN) which may connect to a global communications network, such as the Internet. In other embodiments, communication framework 104 can comprise wireless communications of a global positioning system (GPS) including a GPS transceiver(s) located at power equipment device 102 and one or more global positioning satellite devices. In some embodiments, communication framework 104 can include connectivity between a combination of the foregoing, such as a LAN or a WAN connected to one or more server devices 106 associated with a GPS system. As more specific examples, communication framework 104 can provide communication utilizing: any suitable public, private or commercial cellular voice or data network (second generation (2G), 3G, 4G, WiMAX, 4G long term evolution (LTE), 5G, and so forth), a satellite voice or data network, Bluetooth®, or Wi-Fi technology IEEE 802.11(a, b, g, n, . . . ), infrared, Ultra-Wideband (UWB), or a wired connection such as a universal serial bus (USB) connection, Ethernet connection (e.g., Cat 3, Cat 5, Cat 5e, Cat 6, Cat 6A, and others), or the like, or a suitable combination of the foregoing.

In most embodiments provided herein, server devices 106 and the like are referred to as GPS satellite servers, which can include GPS satellite devices themselves, or server devices separate from the GPS satellite devices that generate or convey GPS positioning data to a GPS client device (e.g., a GPS transceiver of auto-steer and location module 114). It should be understood that communication with server devices 106 by way of communication framework 104 can incorporate any suitable direct or indirect (e.g., by way of one or more non-GPS networks) communication between power equipment device 102 and server devices 106 known in the art, or subsequently developed.

Positioning data can be generated utilizing wireless signals transmitted by auto-steer and location module 114, in one or more embodiments. In other embodiments, positioning data can be generated utilizing distance and orientation devices local to the power equipment device 102 (e.g., one or more odometers, gyroscopes, accelerometers, etc.). In further embodiments, positioning data can be generated utilizing wireless signals transmitted by auto-steer and location module 114 or distance and orientation devices local to the power equipment device 102, or a combination of the foregoing.

Algorithms for generating position data for power equipment device 102 from such wireless signals or local distance/orientation devices can be stored at server data store(s) 122. Alternatively, or in addition, the position data—once generated—can be stored at server data store(s) 122 before being transmitted to power equipment device 102. In a further embodiment, position data can be generated periodically (or semi-periodically, or a-periodically where suitable) to provide a set of position location data for power equipment device 102 over time, to facilitate tracking motion of power equipment device 102. In such embodiment, the position data can be generated from remote wireless sources or local devices and an algorithm can be executed to select whether to use remote wireless source position location data based on a first set of conditions, local device position location data based on a second set of conditions, or a suitable combination of the remote wireless source position location data and local device position location data.

In an embodiment, a period, frequency, rate, etc., of position location data generation can be controlled or modified at auto-steer and location module 114. In some embodiments, the period/frequency/rate of generation of position location data (referred to hereinafter as frequency of position location data) can be selected to be sufficient to track displacement of power equipment device 102 of less than ten centimeters (cm), between 1cm and 10 cm, between 1 cm and 5 cm, between 2 cm and 5 cm, or the like at speeds common to power equipment device 102. Such speeds can include a mile per hour (mph), up to twenty mph, up to thirty mph, or any suitable value or range there between (e.g., 2 or 3 mph, about 5 mph, about 5 to about 10 mph, about 10 to about 15 mph, about 15 to about 20 mph, about 20 to about 30 mph, and so forth). In some embodiments, the frequency of GPS position location data provided by server devices 106 can be greater than 1 hertz (Hz), between about 1 Hz and about 100 Hz, between about 2 Hz and about 50 Hz, between about 5 Hz and about 20 Hz, between about 7 Hz and about 15 Hz, about 8 Hz, about 10 Hz, about 12 Hz or about 15 Hz. Other suitable frequencies of GPS position location data can be provided. Moreover, suitable frequencies or ranges of frequencies of GPS position located data provision can be selected at auto-steer location module 114 in one or more embodiments, and stored by server devices 106 at server data store(s) 122. Thereafter, generation and provision of GPS position location data can be at (or approximately at) the selected frequency.

GPS position location data determined from wireless signals between a terrestrial device (e.g., power equipment device 102) and a set of orbiting satellite devices can experience small perturbations based on atmospheric conditions (e.g., atmospheric refraction of electromagnetic transmissions) existing between terrestrial and orbiting devices. Moreover, these perturbations can change over time, due to changes in the atmospheric conditions, as one example. Accordingly, communication environment 100 can employ a location refinement device 108 that is terrestrially located. Location refinement device 108 can utilize a known position on the Earth (either a static position, or a position that is static for a suitable period of time, such as an hour or more, to several days, weeks or months) to identify changes to GPS position location data due to dynamic atmospheric conditions. Corrections to the GPS position location data utilizing the known position on the Earth can be generated for location refinement device 108. Moreover, when power equipment device 102 is within suitable proximity of location refinement device 108 such that atmospheric conditions affecting electromagnetic signals between location refinement device 108 and server devices 106 (or GPS satellites associated with server devices 106) are the same or approximately the same as conditions affecting electromagnetic signals between power equipment device 102, corrections to GPS position location data generated by position location device 108 can be used to correct GPS position location data for power equipment device 102 as well. Suitable proximity of location refinement device 108 and power equipment device 102 can be established by design choice, in some embodiments (e.g., a distance that correlates to less than 2 cm error between corrections to GPS position location data at location refinement device 108 and corrections to GPS position location data at power equipment device 102, as one example, or other suitable error values in other examples). Likewise, conditions affecting electromagnetic signals between power equipment device 102 and server devices 106 (or GPS satellites associated with server devices 106) and those affecting electromagnetic signals between location refinement device 108 and server devices 106 can be established as approximately the same based on design choice (e.g., conditions resulting in less than 2 cm deviation of correction data for location refinement device 108 versus power equipment device 102, or other suitable value).

A wireless link 132 between power equipment device 102 and location refinement device 108 can be established for transfer of position location correction data 134. The position location correction data 134 can be received by autosteer and location module 114 and stored at power equipment device data store(s). Moreover, the position location correction data 134 can be utilized to refine GPS data received from server devices 106, to produce corrected position location data for power equipment device 102. In some embodiments, the position location correction data 134 can be generated by location refinement device 108 and received at power equipment device 102 at a frequency equal to the frequency of position location data received from server devices 106. In other embodiments, the position location correction data 134 can be generated and received at power equipment device 102 at a frequency lower than the position location data received from server devices 106. As an example, where position location correction data 134 is received at a frequency 100 times slower than the position location data received from server devices 106, most recent correction data 134 can be utilized for a plurality of cycles of position location data (e.g., 100 cycles of position location data), and updated upon receipt of new position location correction data 134 for a second plurality of position location data (e.g., a second 100 cycles of position location data). In still other embodiments, position location correction data 134 can be fixed for relatively long periods of time (e.g., an hour, several hours, a day, etc.) and can be utilized as a correction constant for position location data received from server devices 106.

In some embodiments, location refinement device 108 can be a base station of a cellular communication network. Position location correction data 134 can be generated by a service provider of a cellular network, or by a third party employing the fixed position of the base station to generate position location correction data. In other embodiments, location refinement device 108 can be embodied as a public radio tower configured to communicate with server devices 106 at a fixed location. Deviations of GPS position location data provided by server devices 106 can be compared to the fixed location and utilized to generate position location correction data 134 for the fixed location, and for nearby locations (e.g., locations presumed to be affected by substantially the same atmospheric conditions as the fixed location). In other embodiments, location refinement device 108 can be a mobile or semi-mobile wireless communication device that is positioned at a location, and then activated to communicate with server devices 106 by a location refinement device communication channel 136 (e.g., a GPS transceiver employed by the mobile or semi-mobile wireless communication device to communicate with GPS satellites embodying data servers 106, among other examples). The mobile or semi-mobile wireless communication device is fixed in position upon activation and can obtain location data from server devices 106 over a determination time at the position. Obtained location data received over time can be utilized to, at least in part, calculate the position location corrected data for the position. In some embodiments, the mobile or semi-mobile wireless communication device can connect with a public atmospheric data source(s) or private atmospheric data source service, to compare changes in position location with prevailing atmospheric condition data received from the atmospheric data source(s). Position location correction data 134 can be generated for the position after the determination time utilizing position location data received during the determination time in conjunction with the atmospheric data received during the determination time.

Figure 2:
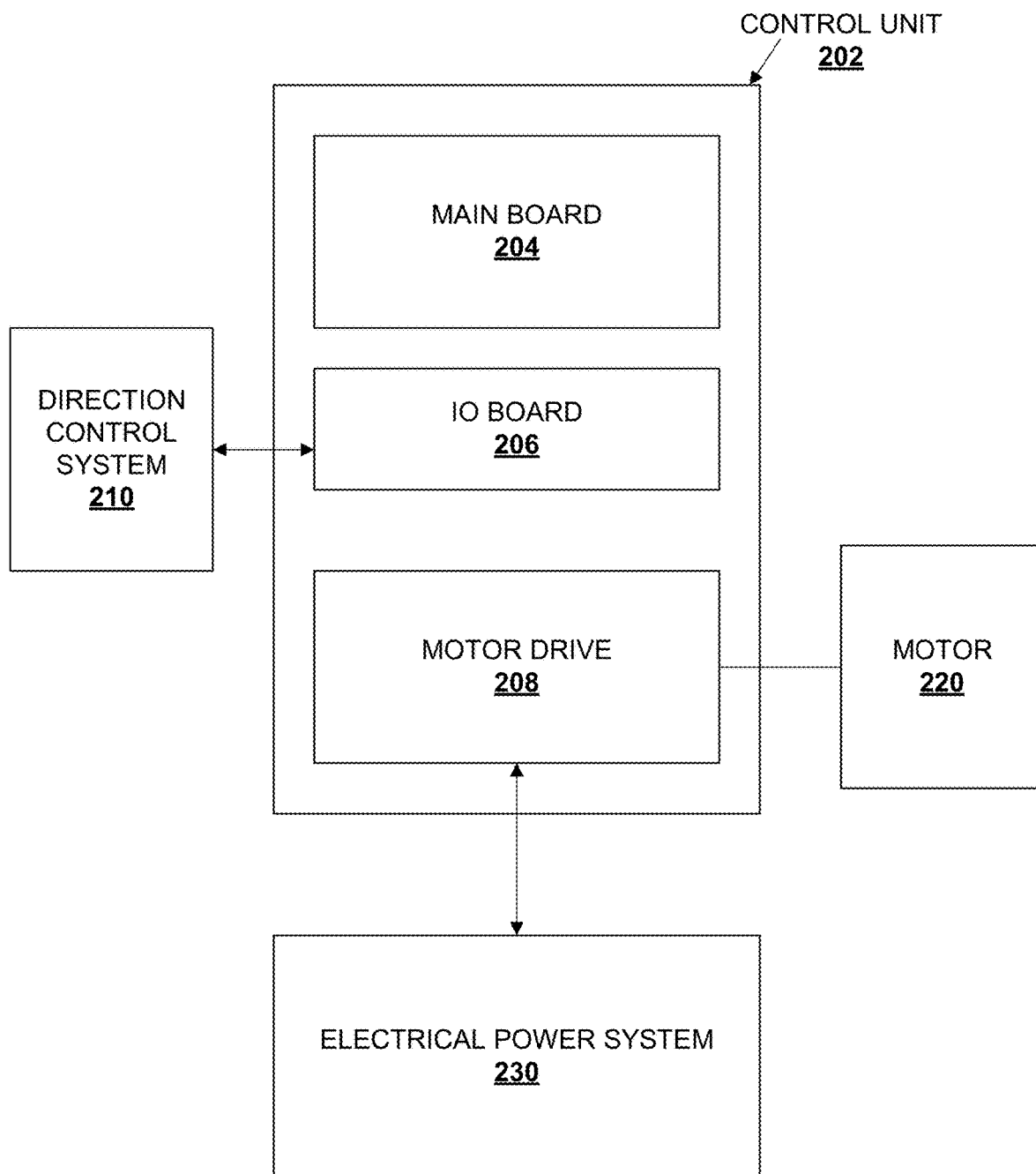
FIG. 2 illustrates a block diagram of a sample mechanical control unit for implementing automated steering according to one or more embodiments.

FIG. 2 illustrates a block diagram of an example control module architecture 200 for a power equipment device, according to some embodiments of the present disclosure. Control module architecture 200 can receive direction change data, and convert the direction change data into an adjusted steering angle for the power equipment device. Changing orientation of a steering apparatus of the power equipment device according to the adjusted steering angle can facilitate changing direction of motion of the power equipment device. Repeating the process of receiving direction change data, generating adjusted steering angles and changing orientation of the steering apparatus to maintain a target path of motion can facilitate automated steering of the power equipment device along the target path of motion, to implement various user-assisted automated steering embodiments of the present disclosure.

Control module architecture 200 can comprise a control unit 202, including a main board 204 and input/output (I/O) board 206. Main board 204 can comprise a suitable computing device, processing device, or the like (e.g., see computer 902 of FIG. 9, infra). Main board 204 can also comprise one or more communication bus devices to communicatively couple main board 204 with I/O board 206, with a motor drive 206, as well as external devices such as direction control system 210.

Motor drive 208 can be powered by an electrical power system 230. Electrical power system 230 can comprise a battery, an alternator, a generator, or the like, or a suitable combination thereof. Utilizing electrical power from electrical power system 230, motor drive 208 can activate a motor 220 connected to a steering control of a power equipment device (not depicted). Direction control system 210 can utilize position location data and generate direction change data for changing a direction of motion of the power equipment device. In an embodiment, the direction change data can reflect an angular difference between a current direction of motion of the power equipment device, and a target direction of motion. In another embodiment, the direction change data can reflect displacement between a current position of the power equipment device and a position along a target path of motion of the power equipment device. In yet another embodiment, the direction change data can reflect the angular difference between the current direction of motion and the target direction of motion in combination with the displacement between the current position and the position along the target path of motion.

In an embodiment, direction control system 210 can convert the direction change data to a corrected steering angle for the power equipment device. In an alternative embodiment, the direction change data can be provided to mainboard 204 by way of I/O board 206, and mainboard 204 can be configured to convert the direction change data to the corrected steering angle. Once the corrected steering angle is determined, mainboard 204 can convert the corrected steering angle into an angular rotation metric for the steering apparatus of the power equipment device. Motor drive 208 can activate motor 220 to change the steering control of the power equipment device by the angular rotation metric. The angular rotation metric can be measured in any suitable parameter that relates to or can translate to a controlled mechanical change in steering that causes a change to a direction of motion of the power equipment device. In an embodiment, the angular rotation metric can be embodied by a rotational angle of steering wheel(s) of the power equipment device (e.g., front wheels connected to a steering axis). In other embodiments, the angular rotation metric can be embodied by a change in position of a steering gear, steering axle or the like that controls the rotational angle of the steering wheel(s) of the power equipment device. Where steering wheels are freely rotating about a center axis of the wheel(s) (and thus are not actively driven), the angular rotation metric can be determined by a set of odometers calculating relative rotational speed of drive wheels (e.g., independently driven rear wheels).

A speed with which steering motor drive 208 converts angular rotation metric data to motor output at motor 220 can impact a quality of the control module architecture 200 for the power equipment device. For instance, the speed of changes to the motor output at motor 220 can affect perceived smoothness of the automated steering provided by control unit 202, and accordingly the perceived comfort of user-assisted automated steering provided by embodiments of the present disclosure. In various embodiments, a frequency of conversion of angular rotation data to motor output at motor 220 can be greater than 10 hertz (Hz); greater than 100 Hz; between about 100 Hz and about 10,000 Hz; between about 200 Hz and about 2,000 Hz; between about 500 Hz and about 1,500 Hz; between about 900 Hz and about 1100 Hz; or about 1,000 Hz in various embodiments.

Figure 3:
FIG. 3 depicts an image of an example power equipment device according to embodiments of the present disclosure.

Referring to FIG. 3, there is depicted an image of an example power equipment device 300 according to one or more embodiments of the present disclosure. Power equipment device 300 can be configured to operate in a manual operating mode, in which an operator controls drive and steering controls of power equipment device 300, and can be configured to operate in a semi-autonomous operating mode, in which a processing device coupled with position location equipment operates the steering controls of power equipment device 300.

In various embodiments, power equipment device 300 includes movable arms 304, 306 (e.g., armrests, as one non-limiting example) configured to rest in multiple positions relative an operator position 308. In at least one embodiment, movable arms 304, 306 can be adjustable such that one or more of the multiple rest positions can be adjusted by an operator of power equipment device 300. As one example, the multiple positions can include an open position facilitating operator ingress to or egress from operator position 308 (e.g., see FIG. 4, infra). As another example, the multiple positions can include a closed position facilitating physically securing an operator within operator position 308 (e.g., see FIG. 5, infra). Moreover, the closed position can be configured to position manual steering controls of power equipment device 300 and autonomous guidance controls of power equipment device 300, positioned on the movable arms 304, 306, at the hands of an operator located at operator position 308.

A graphical display 302 is also provided. Graphical display 302 can be electronically and communicatively connected with a control device (not depicted, but see FIGS. 1 and 2, supra and FIG. 9, infra) of power equipment device 300. Graphical display 302 can serve as an operator input/output interface to view, define, modify, etc., functions of power equipment device 300, such as: operational functions, geographical boundary definition functions, pathing guidance functions, geographic boundary management functions, fuel conservation functions, settings of the control device, electrical or mechanical settings of power equipment device 300, or the like, or a suitable combination of the foregoing.

Figure 4:
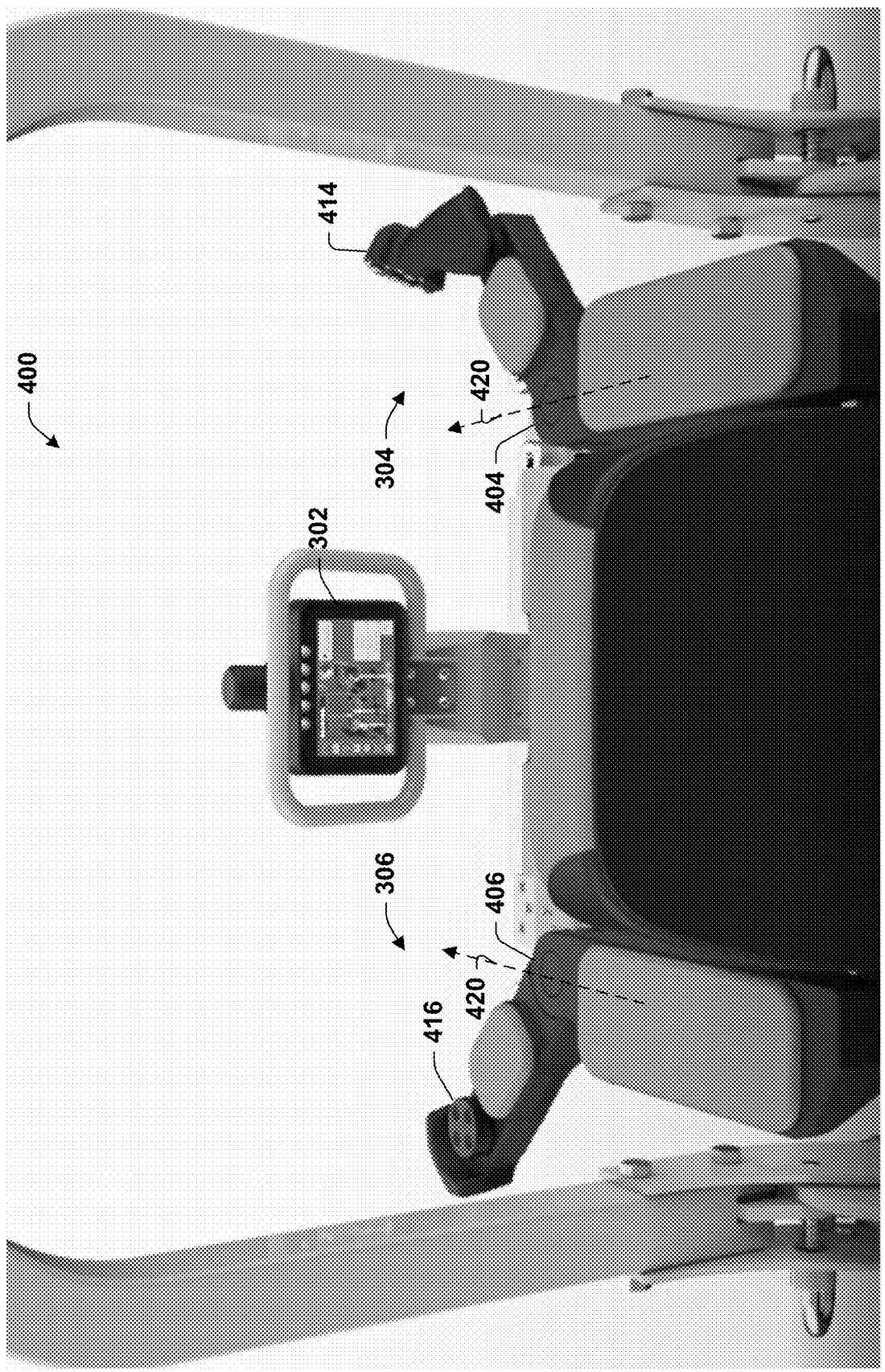
FIG. 4 illustrates a picture of the example power equipment device of FIG. 3 with movable armrest devices and graphical display, in additional embodiments.

Referring to FIG. 4, there is depicted another view 400 of power equipment device 300 according to additional embodiments of the present disclosure. Movable arms 304, 306 will be referred to individually as right movable arm 304 and left movable arm 306. In the embodiment illustrated by view 400, movable arms 304, 306 pivot about rotation points 404 and 406, respectively. When rotated fully away from operator position 308 (e.g., as illustrated in view 400) movable arms 304, 306 can be in the open position facilitating operator ingress to or egress from operator position 308. When rotated fully into and in front of operator position 308 (e.g., see FIG. 5, infra) movable arms 304, 306 can be in the closed position physically securing an operator within operator position 308.

In at least one embodiment, rotation points 404, 406 can include tensioning components (e.g., mechanical tensioning component(s), a spring, tension rod, or other device for storing/applying elastic potential energy) configured to cause movable arms 304, 306 to move to one or more of the multiple rest positions from another (non-rest) position. For instance, the tensioning components can cause a movable arm 304, 306 to move to the open position or to the closed position when between such positions. In another embodiment, the tensioning components can cause a movable arm 304, 306 to move to either the open position or to the closed position when between such positions and beyond a threshold position that is between the open position and the closed position. As a specific example, the threshold position can be straight outward (e.g., along dotted arrows 420) from a rear (fixed) portion of a movable arm 304, 306 near to operator position 308 and opposite rotation points 404, 406 along movable arms 304, 306 from manual steering controls 416 and autonomous guidance controls 414. Alternatively, the threshold position can be approximately straight outward from the rear portion (e.g., within one to five degrees rotation of rotation points 404, 406 from the straight outward direction 420). When a movable arm 304, 306 is moved beyond the threshold position (e.g., in a direction of the open position), the tensioning components can impose a force to move the movable arm 304, 306 to the open position. In another embodiment, when the movable arm 304, 306 is moved beyond the threshold position (e.g., in a direction of the closed position), the tensioning components can impose a force to move the movable arm 304, 306 to the closed position. In still another embodiment, tensioning components can be provided to effect multiple threshold positions: a first threshold position beyond which rotation of movable arm 304, 306 results in a force to move the movable arm 304, 306 to the closed position, and a second threshold position beyond which rotation of movable arm 304, 306 results in a second force to move the movable arm 304, 306 to the open position.

In the embodiment(s) illustrated by image 400, manual steering controls 416 are provided near an end of movable arm 306, although other embodiments can position manual steering controls 416 at different locations on power equipment device 300. Manual steering controls 416 include a rotational wheel and digital encoder configured to send a rotational steering angle signal to a steering control device (e.g., control unit 202 of FIG. 2, auto-steer and location module 114 of FIG. 1, computer 902 of FIG. 9, and so forth) configured to convert the rotational steering angle signal to a change in direction of power equipment device 300. The change in direction can be represented by a change in orientation of steering wheels (e.g., front wheels, . . . ) of power equipment device 300 calibrated to the rotational steering angle signal, can be represented by a change in relative speed(s) of drive wheels (e.g., rear wheels, . . . ) of power equipment device 300 calibrated to the rotational steering angle signal, or other suitable mechanism for controlling orientation of power equipment device 300 on a surface. In a further embodiment, the change in direction is implemented by one or more electric motors in response to an output from the steering control device, and mechanically independent from movement of manual steering controls 416. This enables manual steering controls 416 to be rotatable with much less force than that provided (by the electric motor(s)) to effect physical control over the turning of power equipment device 300.

Autonomous guidance controls 414 are positioned near an end of movable arm 304, though the present disclosure is not limited to this example placement of autonomous guidance controls 414, and other embodiments can position such controls elsewhere on power equipment device 300. In the embodiment illustrated by image 400, autonomous guidance controls 414 and manual steering controls 416 are moved toward a front-center placement with respect to operator position 308, along movable armrests 304, 306. An operator's hands can therefore naturally rest at manual steering controls 416 and autonomous guidance controls 414 when the operator's arms are resting on movable arms 304, 306.

Figure 5:
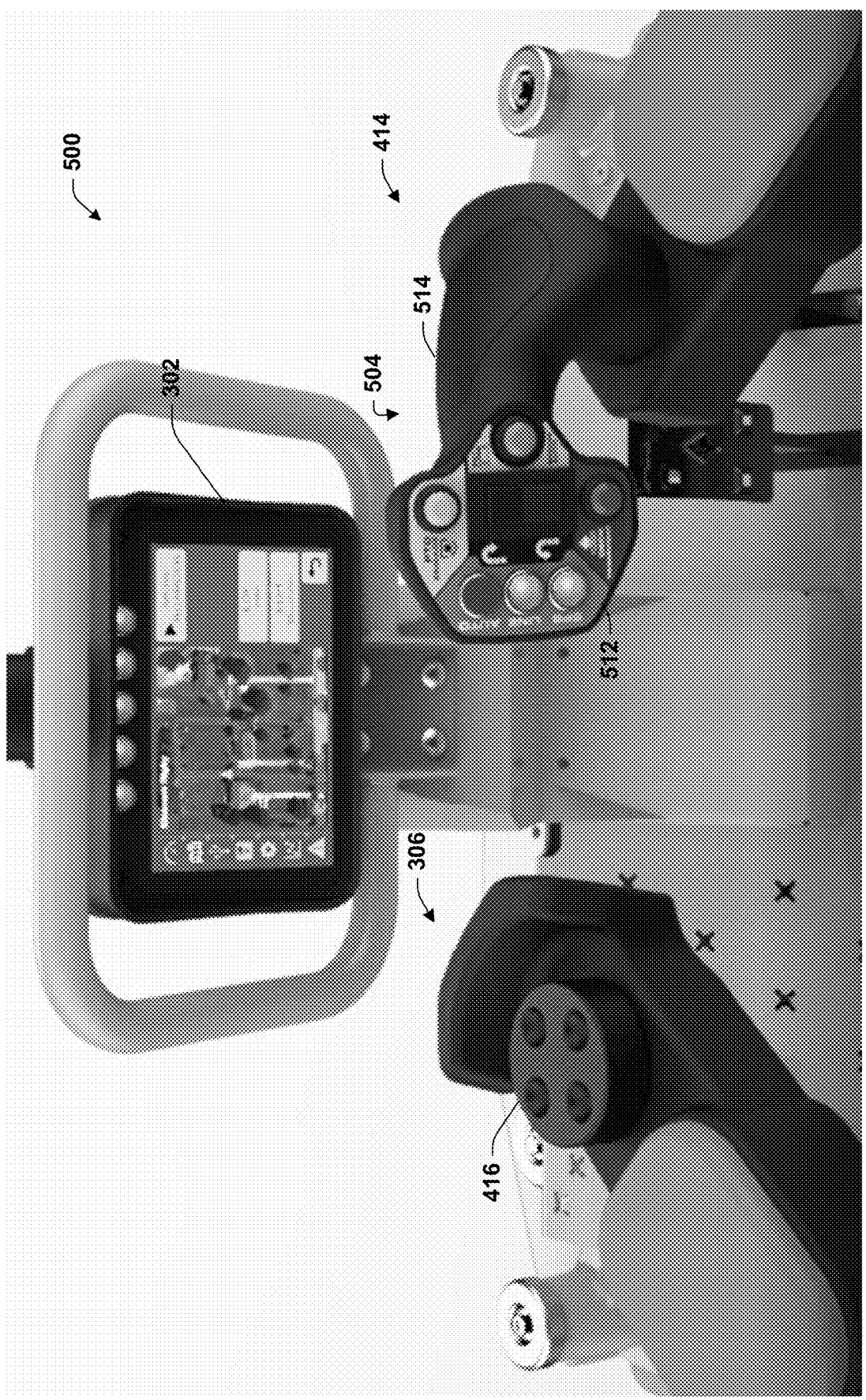
FIG. 5 depicts an image of the example power equipment device of FIG. 3 with movable armrest devices in a closed position, in another embodiment(s).

FIG. 5 depicts a further example image 500 of movable arms 304, 306 of power equipment device 300 in an example closed position physically securing the operator. Additionally, the example closed position places manual steering controls 416 and autonomous guidance controls 414 at a vicinity of an operator's hands, when the operator's arms are resting on movable arms 304, 306. In the embodiment(s) illustrated with image 500, autonomous guidance controls 414 are formed as an ergonomic module 504 configured to be comfortable within an operator's hand, when the operator's arm is resting on movable arm 304. Ergonomic module 504 includes a formed surface 514 designed to comfortably support a palm of a human hand in a resting position, and a control panel 512 positioned at a resting position of a human thumb when the human hand is comfortably supported by formed surface 514. This allows the thumb to naturally engage with operator input devices (pictured as buttons and rocker switch, but can include other switches, sliders, dials, and so forth) of autonomous guidance controls 414, minimizing or avoiding operator fatigue when operating power equipment device 300. Additionally, manual steering controls 416 are positioned where an operator's second hand naturally rests when the operator's second arm is resting on movable arm 406. As mentioned above, manual steering controls 416 can be operated independent of the pressure or force required to mechanically operate a steering mechanism of power equipment device 300, and in an embodiment manual steering controls 416 can be operated with very low pressure or force configured to minimize or avoid fatigue to the operator's second hand. As a result, manual steering controls 416 are configured to further minimize or avoid operator fatigue when operating power equipment device 300.

Figure 6:
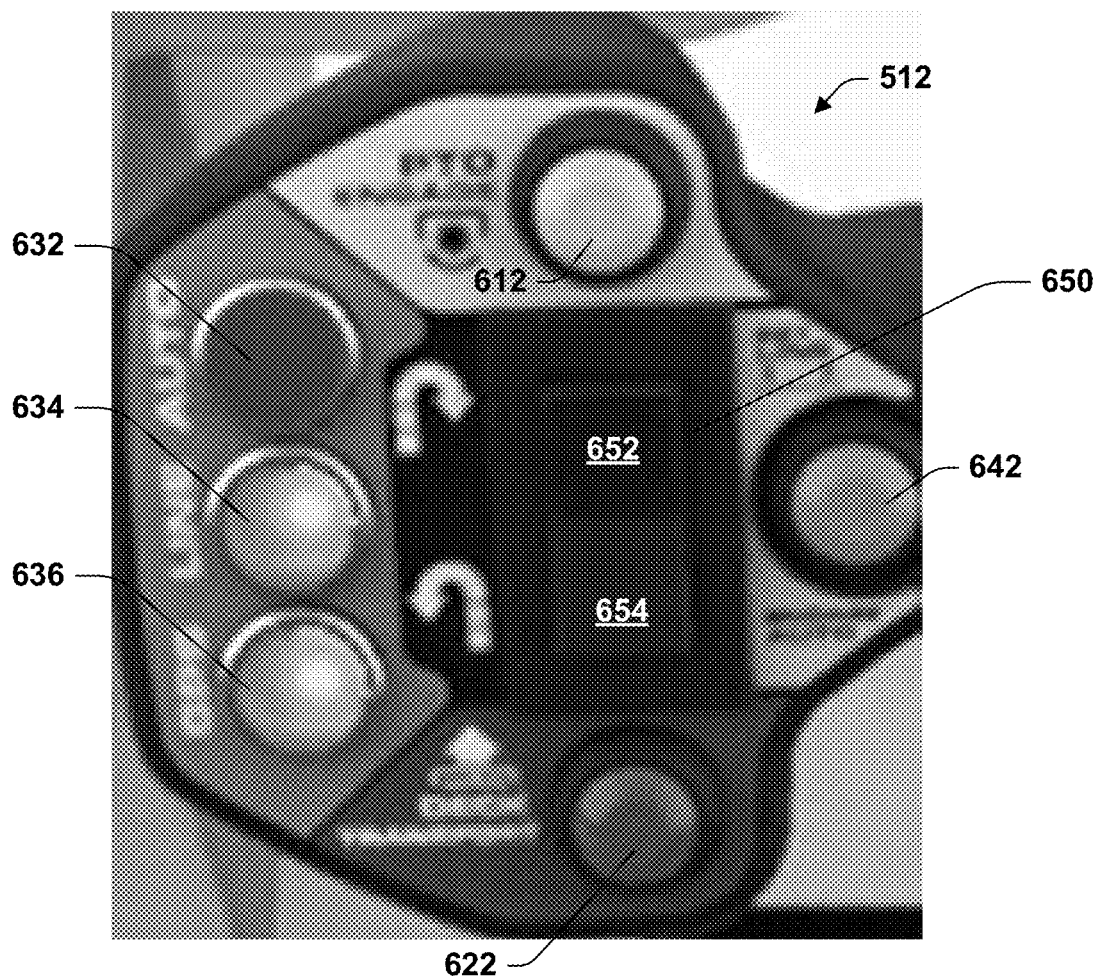
FIG. 6 illustrates an image of an example layout of user input/output controls positioned on a hand rest structure secured to an armrest of the power equipment device.

FIG. 6 depicts an image 600 of the user input/output devices of the control panel 512 of autonomous guidance controls 414. In the example embodiment of FIG. 6, the user input/output devices include a PTO engage/disengage input device 612, a mow deck transport input device 622 (configured, e.g., to disengage the mow deck upon activation (e.g., first press, press-and-hold, etc.) and reengage the mow deck upon deactivation (e.g., second press, release of press-and-hold, or the like)), a pathing line definition button 642, and auto left turn command 654 and auto right turn command 652 buttons. As utilized herein, the term disengage or reengage the mow deck means to position a cutting unit in a desired cutting position relative to a surface to be cut (e.g., vegetation), such that the cutting unit is cutting the surface to be cut when engaged/reengaged, and the cutting unit is not cutting the surface when disengaged. All mechanical means for not cutting the surface are intended to be incorporated within the term disengage as would be understood by one of ordinary skill in the art or reasonably conveyed to one of ordinary skill by way of the context provided herein. For example, lifting the cutting deck above the surface to be cut (e.g., above the vegetation) is one example of disengaging the mow deck; turning off the power source to the cutting unit is another example of disengaging the mow deck; lifting the mow deck and turning off the power source to the cutting unit is yet another example of disengaging the mow deck, yet the present disclosure is not limited to these examples.

In addition to the foregoing, user input/output devices include an automatic drive mode activation/deactivation indicator 632 (e.g., light indicator), a pathing line definition indicator 634, and a wireless position location acquisition indicator 636 (e.g., indicating a status of GPS fix signal, or the like). Other input/output devices (not depicted) can be provided for control panel 512 in other embodiments, or some input/output devices provided can be absent in still further embodiments, or a suitable combination of the foregoing.

Figure 7:
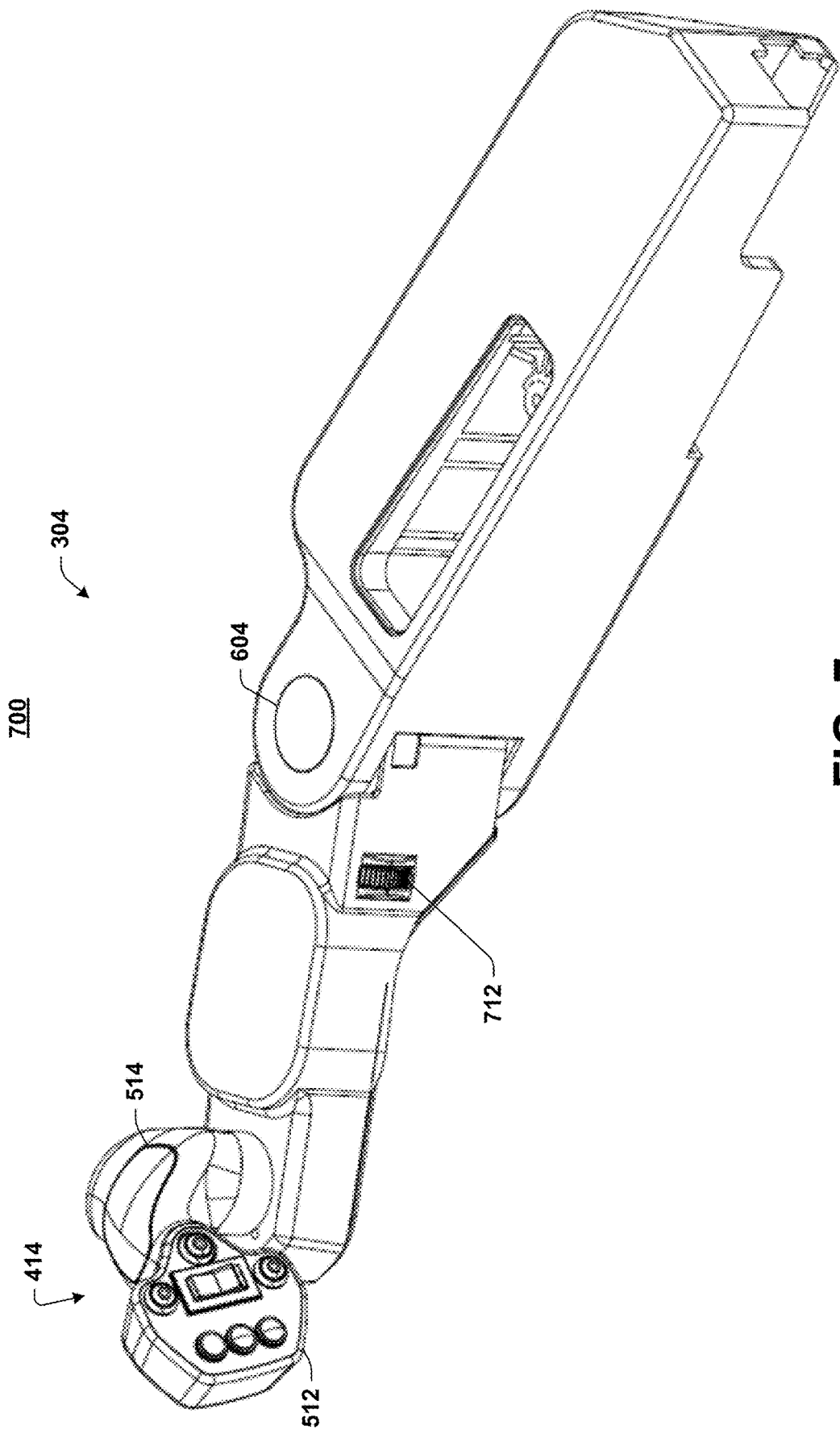
FIG. 7 depicts a diagram of an example movable armrest and ergonomic hand control with adjustment mechanism in a further embodiment.

FIG. 7 illustrates a sample drawing of movable arm 304 according to still further embodiments of the present disclosure. A pivot point 604 defines a point about which a front portion of movable arm 304 can rotate about a rear fixed portion of movable arm 304. Additionally, an operator adjustment 712 facilitates operator control over a closed position of movable arm 304, in an embodiment. As one example, operator adjustment 712 can enable the operator to control the location of the closed position, bringing the closed position closer to the operator position 308 or moving the closed position further away from the operator position 308, for operator comfort. A similar operator adjustment 712 can be provided on movable arm 306 in further embodiments, enabling independent adjustment of the closed position of movable arm 306 respective to movable arm 304. In one or more additional embodiments, operator adjustment 712 can also control an open position of movable arm 304, for example: adjusting the open position farther from the closed position or closer to the closed position, or adjusting a threshold position beyond which a tensioning component(s) exerts a first force causing the movable arm 304 to move to the open position, or exerts a second force causing the movable arm 304 to move to the closed position, or the like, or a suitable combination of the foregoing positions or positions described elsewhere herein, or as reasonably conveyed to one of ordinary skill in the art by way of the context provided herein.

Figure 8:
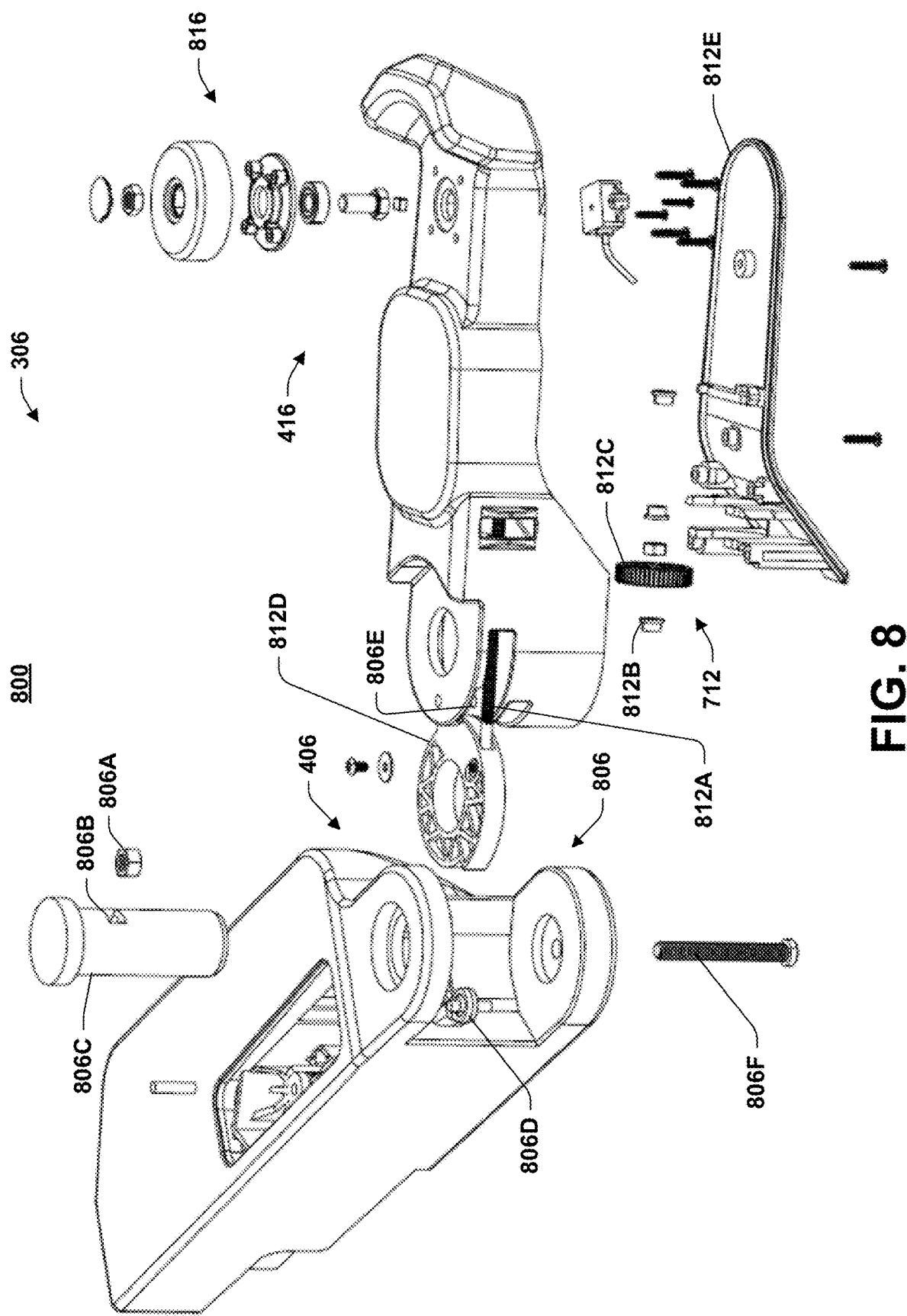
FIG. 8 illustrates a diagram of a sample component diagram of an example movable armrest for a power equipment device according to still other embodiments.

FIG. 8 depicts an example component drawing 800 of movable arm 306 according to still further embodiments of the present disclosure. For instance, component diagram 800 illustrates example respective mechanical components to embody rotation point 406, manual steering controls 416 and operator adjustment 712. Components 806 embodying rotation point 406 can include a securing nut 806A that slips into a slot 806B in a pivot pin 806C. A gas spring 806D (e.g., tensioning component) can be pinned in a front portion of movable arm 306 at a hole 806E and secured to an interior of pivot point 406 as illustrated. Operator adjustment 712 includes, for example, a threaded rod 812A provided through an adjustment wheel 812C and bushings 812B for rotatably positioning the adjustment wheel 812C about the threaded rod 812A of the front portion of movable arm 306. Adjustment wheel 812C and bushings 812B can be secured and fixed upon assembly of lower cover 812E to the front portion of movable arm 306. An armrest adjustment puck 812D can slide into a shelf on the front portion of movable arm 306 (in which hole 806E is located) and secured by pivot pin 806C extending through a center hole of armrest adjustment puck 812D and a fastener 806F extending through pivot pin 806C, armrest adjustment puck 812D and secured to securing nut 806A within slot 806B. Armrest adjustment puck 812D is further positioned onto threaded rod 812A and actuated in response to rotation of adjustment wheel 812C through positioning on threaded rod 812A.

Figure 9A:
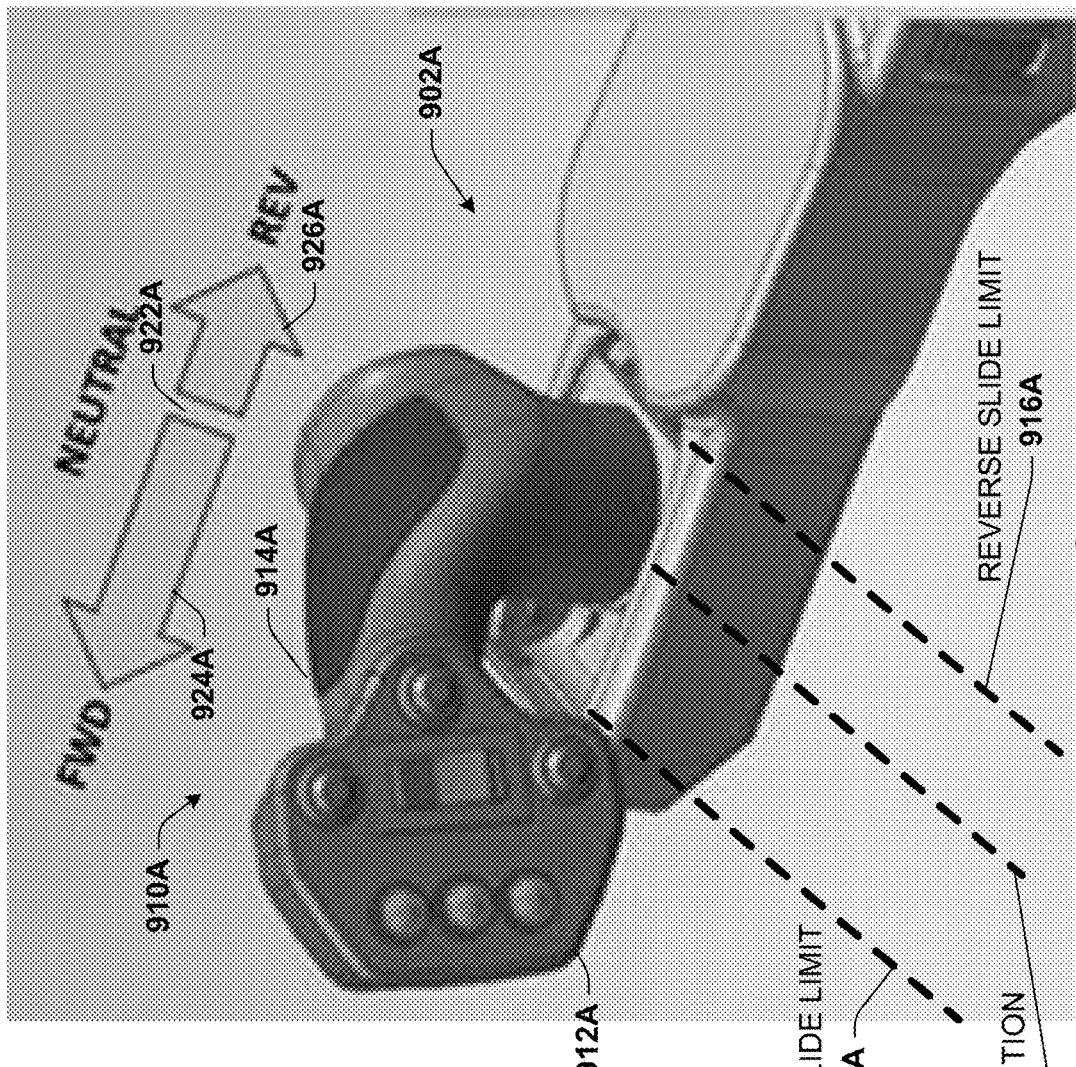
FIG. 9A depicts an image of an example joystick control module for an armrest of a power equipment device, in another embodiment(s).

FIG. 9A illustrates an embodiment in which autonomous guidance controls 414 are embodied with a joystick module 910A. Joystick module 910A can comprise an ergonomic surface 914A similar to formed surface 512 and an operator interface 912A similar to control panel 512 in various embodiments, though it should be understand that some or all of the features or functionality of ergonomic surface 914A or operator interface 912A can differ from the features or functionality of formed surface 512 and control panel 512 described elsewhere herein. In various embodiments, joystick module 910A can further be physically movable within an armrest structure 902A in response to a force applied by an operator. Such movement within armrest structure 902A can generate an acceleration signal causing a control unit (e.g., control unit 202, . . . ) to engage a drive motor of a power equipment device to activate drive wheels and move the power equipment device in a direction and at a speed. In various embodiments, a direction and displacement of joystick module 910A can determine the direction and speed of the activated drive wheels. As one example a forward direction 924A can cause the control unit to activate the drive wheels in a forward direction, whereas a reverse direction 926A of the joystick module 910A can cause the control unit to activate the drive wheels in a reverse direction. A displacement of the joystick module 910A between a neutral slide position 914A and forward slide limit 912A can be utilized to determine a rate of speed of the power equipment device in the forward direction, whereas displacement of the joystick module 910A between the neutral slide position 914A and a reverse slide limit 916A can be utilized to determine a rate of speed of the power equipment device in the reverse direction. In at least one embodiment, a ratio of forward displacement between neutral slide position 914A to forward slide limit 912A can be proportionately applied by control unit to forward speed of the drive wheels, with neutral slide position 914A equal to zero forward speed and forward slide limit 912A equal to maximum forward speed. Likewise, a ratio of reverse displacement between neutral slide position 914A and reverse slide limit 916A can be proportionately applied by the control unit to reverse speed of the drive wheels, with neutral slide position 914A equal to zero reverse speed and reverse slide limit 916A equal to maximum reverse speed.

Figure 9B:
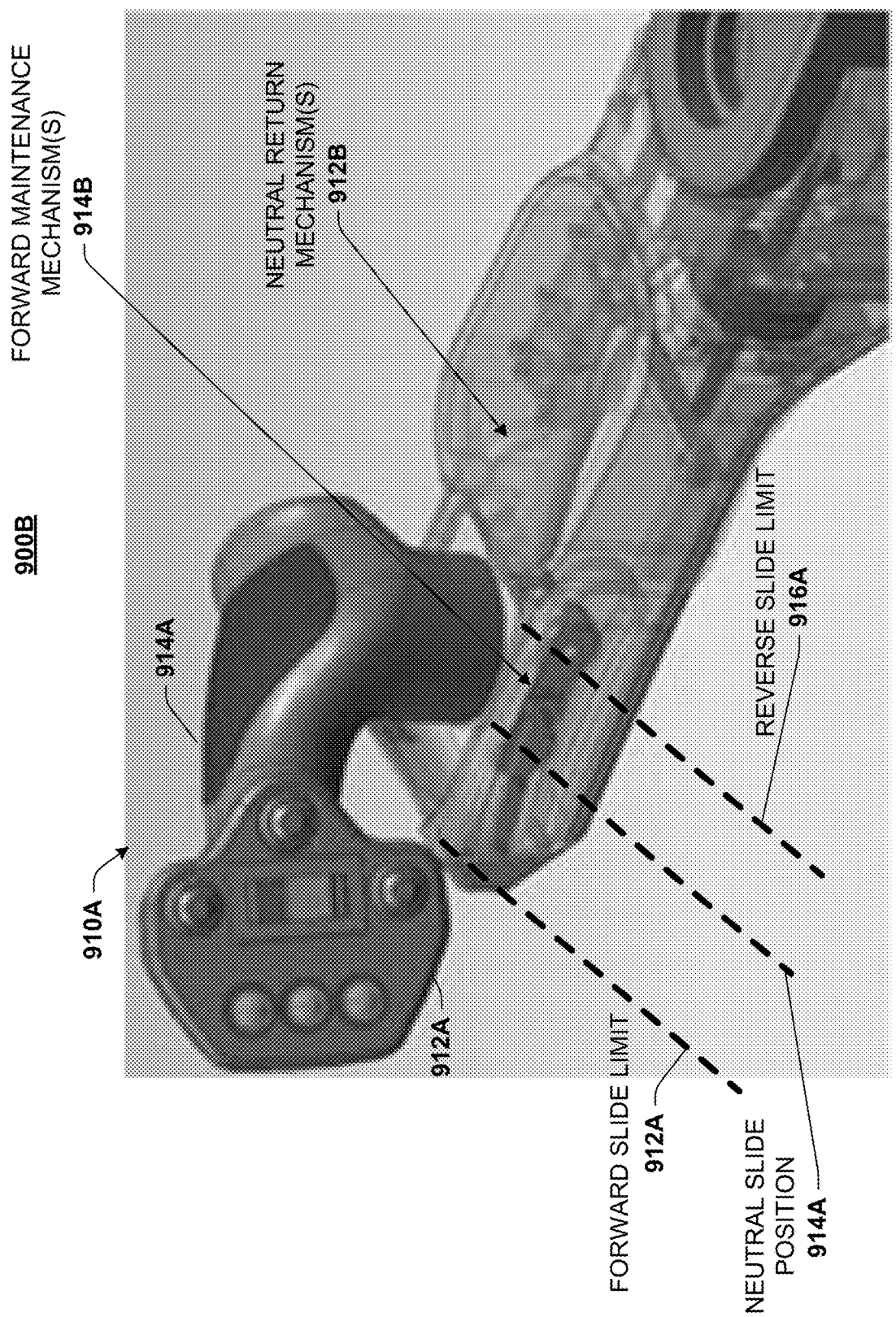
FIG. 9B illustrates an image of internal components and functionality of the example joystick control module of FIG. 9A, according to still further embodiments.

FIG. 9B illustrates an image 900B of a further embodiment of joystick module 910A. In this embodiment, the slide mechanism of joystick module 910A includes a neutral return mechanism 912B that imposes a force to return joystick module 910A from a reverse slide position, between neutral slide position 914A up to and including reverse slide limit 916A back to neutral slide position 914A. Thus, reverse slide would require an operator to maintain joystick module 910A in the reverse slide position thereby overcoming the return force. If the operator were to release joystick module 910A or reduce the pressure to overcome the return force, then the return force would restore joystick module 910A in neutral slide position 914A. The means for applying the return force are provided at neutral return mechanism(s) 912B, and can include a spring(s), coil(s), gas spring(s), sliding gas spring(s), or any other suitable mechanism known in the art or reasonably conveyed to one of ordinary skill in the art by way of the context provided herein to perform the described function. Also depicted is a forward maintenance mechanism(s) 914B configured to maintain joystick module 910A in a forward position between neutral slide position 914A and up to and including forward slide limit 912A, without requiring an operator to maintain a force on joystick module 910A. Accordingly, forward maintenance mechanism(s) 914B can retain joystick module 910A at a current position between neutral slide position 914A and forward slide limit 912A absent an operator's pressure on joystick module 910A. Forward maintenance mechanism(s) 914B can include a magnet(s), movable magnetic retention sleeve or collar, or any other suitable mechanism known in the art or reasonably conveyed to one of ordinary skill in the art by way of the context provided herein to perform the described function.

In connection with FIG. 10, the systems and processes described below can be embodied within hardware, such as a single integrated circuit (IC) chip, multiple ICs, an application specific integrated circuit (ASIC), or the like. A suitable operating environment 1000 for implementing various aspects of the claimed subject matter includes a computer 1002. In various embodiments, a control unit (e.g., control unit 112, control unit 202, and so forth) of a power equipment device can be embodied in part by computer 1002, or an analogous computing device known in the art, subsequently developed, or made known to one of ordinary skill in the art by way of the context provided herein.

The computer 1002 includes a processing unit 1004, a system memory 1010, a codec 1014, and a system bus 1008. The system bus 1008 couples system components including, but not limited to, the system memory 1010 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1010 can include volatile memory 1010A, non-volatile memory 1010B, or both. Functions of a control unit (among other control units: 112, 202, . . . , depicted herein) described in the present specification can be programmed to system memory 1010, in various embodiments. The basic input/output system (BIOS), containing the basic routines to transfer information between elements within the computer 1002, such as during start-up, is stored in non-volatile memory 1010B. In addition, according to present innovations, codec 1014 may include at least one of an encoder or decoder, wherein the at least one of an encoder or decoder may consist of hardware, software, or a combination of hardware and software. Although, codec 1014 is depicted as a separate component, codec 1014 may be contained within non-volatile memory 1010B. By way of illustration, and not limitation, non-volatile memory 1010B can include read only memory (ROM), programmable ROM (PROM), electrically programmable ROM (EPROM), electrically erasable programmable ROM (EEPROM), or Flash memory. Non-volatile memory 1010B can be embedded memory (e.g., physically integrated with computer 1002 or a mainboard thereof), or removable memory. Examples of suitable removable memory can include a secure digital (SD) card, a compact Flash (CF) card, a universal serial bus (USB) memory stick, or the like. Volatile memory 1010A includes random access memory (RAM), which can serve as operational system memory for applications executed by processing unit 1004. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM), and so forth.

Computer 1002 may also include removable/non-removable, volatile/non-volatile computer storage medium. FIG. 10 illustrates, for example, disk storage 1006. Disk storage 1006 includes, but is not limited to, devices such as a magnetic disk drive, solid state disk (SSD) floppy disk drive, tape drive, Flash memory card, memory stick, or the like. In addition, disk storage 1006 can include storage medium separately or in combination with other storage medium including, but not limited to, an optical disk drive such as a compact disk ROM device (CD-ROM) or derivative technology (e.g., CD-R Drive, CD-RW Drive, DVD-ROM, and so forth). To facilitate connection of the disk storage 1006 to the system bus 1008, a removable or non-removable interface is typically used, such as interface 1012. In one or more embodiments, disk storage 1006 can be limited to solid state non-volatile storage memory, providing motion and vibration resistance for a control unit (e.g., control unit 112, among others) operable in conjunction with a power equipment machine (e.g., power equipment machine 102, etc.).

Figure 10:
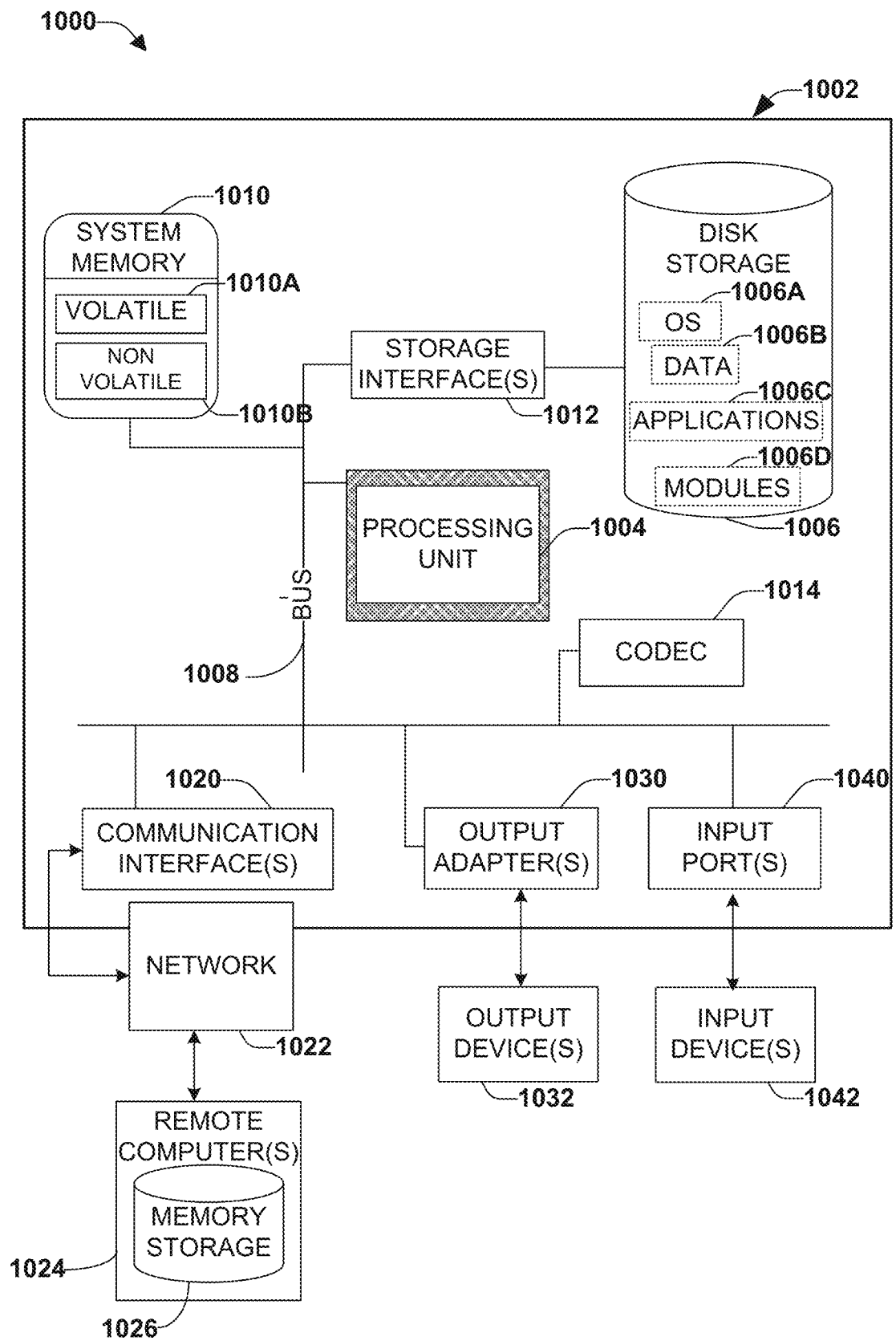
FIG. 10 depicts a diagram of an example computing environment for electronic and data management and computer control for a power equipment machine, in an embodiment.
Figure 11:
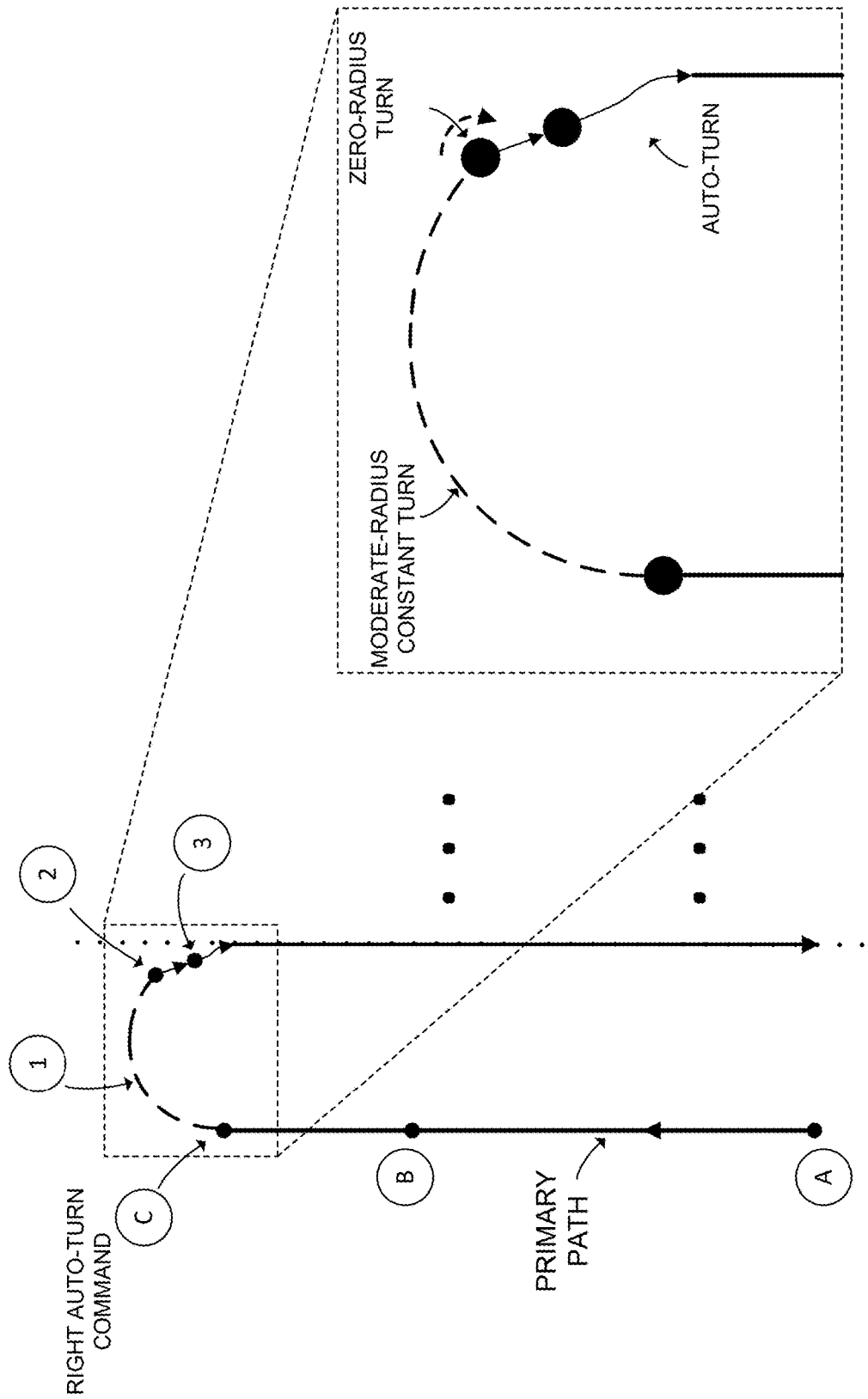
FIG. 11 depicts a diagram of a sample three-state auto-turn.
Figure 12:
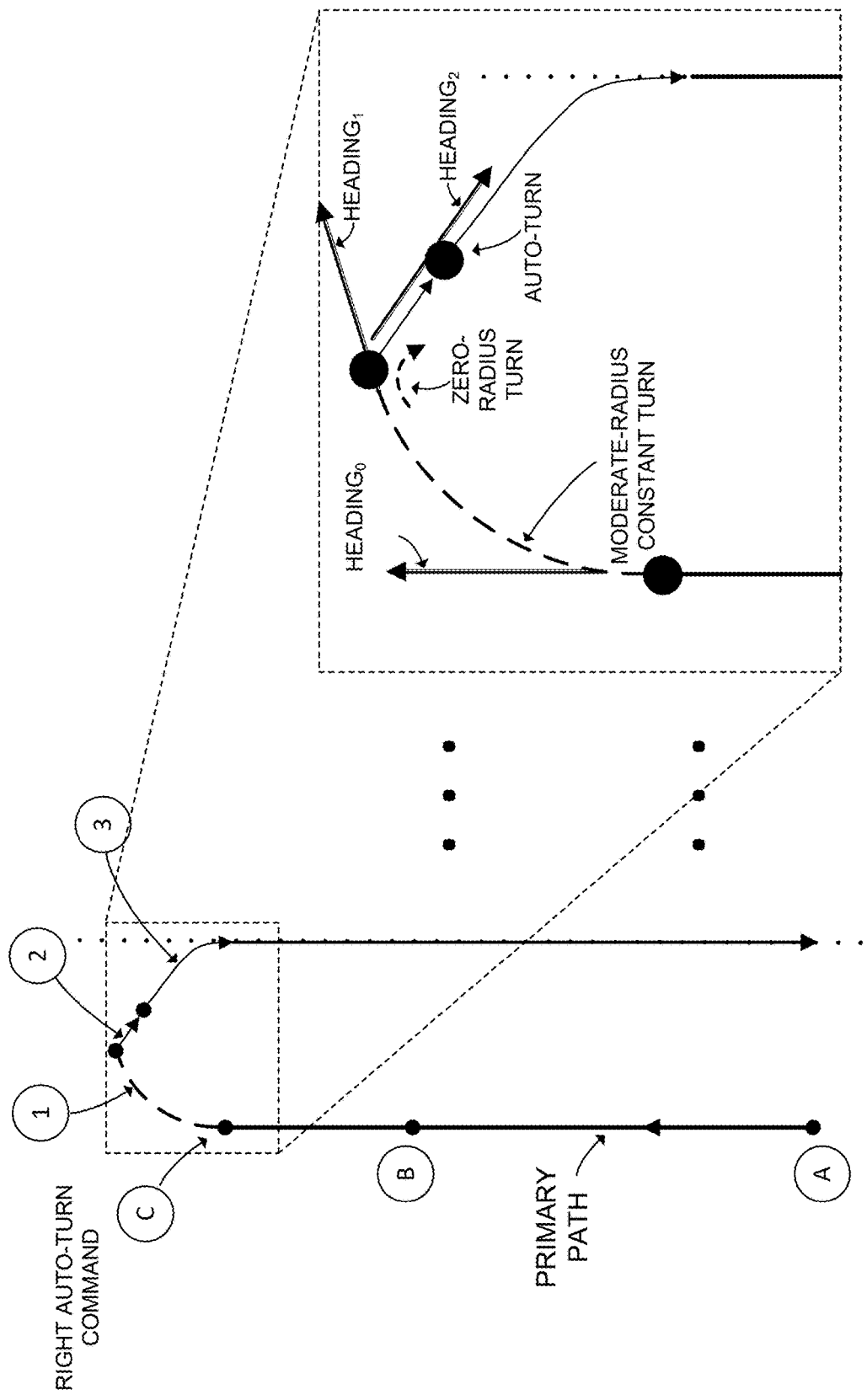
FIG. 12 depicts a diagram of an example three stage auto steering turn algorithm.

It is to be appreciated that FIG. 10 describes software that can program computer 1002 to operate as an intermediary between an operator of a power equipment machine (e.g., power equipment machine 102, and others), or operate as an intermediary between the power equipment machine and an autonomous steering system (or partially autonomous, user-assisted steering system) for operating the power equipment machine embodied within operating environment 1000. Such software includes an operating system 1006A. Operating system 1006A, which can be stored on disk storage 1006, acts to control and allocate resources of the computer 1002. Applications 1006C take advantage of the management of resources by operating system 1006A through program modules 1006D, and program data 1006B, such as the boot/shutdown transaction table and the like, stored either in system memory 1010 or on disk storage 1006. It is to be appreciated that the claimed subject matter can be implemented with various operating systems or combinations of operating systems.

Input device(s) 1042 connects to the processing unit 1004 and facilitates operator interaction with operating environment 1000 through the system bus 1008 via interface port(s) 1030. Input port(s) 1040 can include, for example, a serial port, a parallel port, a game port, a universal serial bus (USB), among others. Output device(s) 1032 use some of the same type of ports as input device(s) 1042. Thus, for example, a USB port may be used to provide input to computer 1002 and to output information from computer 1002 to an output device 1032. Output adapter 1030 is provided to illustrate that there are some output devices, such as graphic display, speakers, and printers, among other output devices, which require special adapters. The output adapter 1030 can include, by way of illustration and not limitation, video and sound cards that provide a means of connection between the output device 1032 and the system bus 1008. It should be noted that other devices or systems of devices provide both input and output capabilities such as remote computer(s) 1024 and memory storage 1026.

Computer 1002 can operate in conjunction with one or more electronic devices described herein. For instance, computer 1002 can embody a power equipment control unit 202 configured to operate direction control system 210 and motor 220 to provide user-assisted steering along defined paths, as described herein. Additionally, computer 1002 can communicatively couple with auto-steer and location module 114, among other disclosed components and devices to generate steering data to maintain a target path, including position and direction of motion, of a power equipment device. Computer 1002 can communicatively couple with various disclosed components by way of a network interface 1022 (e.g., a wireless network interface, a wired network interface, a global positioning system (GPS) interface, and so forth), in an embodiment.

Communication connection(s) 1020 refers to the hardware/software employed to connect the network interface 1022 to the system bus 1008. While communication connection 1020 is shown for illustrative clarity inside computer 1002, it can also be external to computer 1002. The hardware/software necessary for connection to the network interface 1022 includes, for exemplary purposes only, internal and external technologies such as, modems including regular telephone grade modems, cable modems and DSL modems, ISDN adapters, and wired and wireless Ethernet cards, hubs, and routers.

In regard to the various functions performed by the above described components, machines, devices, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as electronic hardware configured to implement the functions, or a computer-readable medium having computer-executable instructions for performing the acts or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present disclosure.

It is also understood that the examples and embodiments described herein are for illustrative purposes only and that various modifications or changes in light thereof will be suggested to persons skilled in the art and are to be included within the spirit and purview of this application and scope of the appended claims.

A turn can comprise a turn having a radius smaller than a width of a work engine (e.g., a mow deck) of the power equipment device. For example, a low-radius turn can be ¾ of the width of the work engine, or less; ⅔ of the width of the work engine, or less, ½ of the width of the work engine, or less; ⅓ of the width of the work engine, or less; ¼ of the width of the work engine, or less, or any suitable value between a zero radius turn and the width of the work engine. An automatic turn may be performed utilizing a three-state auto-turn steering. A primary path is created and parallel lines are created at respective threshold distances from the primary path. When an operator initiates a right auto-turn command three-state auto-turn steering begins with a first stage in the direction of the command, with a moderate (or low) radius constant turn. The first stage for the moderate radius constant turn can be guided by an IMU position location system, in some embodiments, in which a constant rate of turn is initiated until a threshold portion of the turn is completed. Once the threshold portion of moderate radius constant turn is complete, a second stage zero-radius turn or pivot turn can be implemented. The zero-radius turn can be implemented until a current heading of the power equipment device is within a second threshold angular displacement from a completed turn (e.g., 180-degree turn) is performed. The second threshold angular displacement can be between 15 to 30 degrees from completion of the turn, or any suitable value or range there between. Angular rotation of the power equipment device during the second stage zero-radius turn can be measured by IMU position location, in various embodiments. Upon completion of zero-radius turn, a third stage auto-turn can be implemented, utilizing an algorithm for generating steering adjustment data to align a current heading of the power equipment device with a target heading or target path, as described herein. As one of ordinary skill would understand, similar three-state auto turn steering can be implemented for a left hand turn in response to an operator entry of a left auto-turn command, rather than the right auto-turn command.

What is claimed is:

1. A power equipment device, comprising:
    a steering apparatus including one or more electric motors configured to change an orientation of the power equipment device on a surface in response to a direction change signal;
    a steering control unit for generating and outputting values for the direction change signal to implement the change in the orientation of the power equipment device;
    an operator activated manual steering mode causing the steering control unit to receive a first steering control signal generated in response to a rotation of a wheel encoder module, wherein the steering control unit stores a calibration between the direction change signal and the first steering control signal enabling manual steering of the power equipment device in response to the rotation of the wheel encoder module;
    an operator activated autonomous steering mode causing the steering control unit to calculate a second steering control signal in response to comparing a current position or orientation of the power equipment device generated by a positioning module relative to a target position or orientation of the power equipment device;
    an autonomous guidance module comprising one or more user input devices and configured to define a primary path in response to a plurality of activations of the one or more user input devices and respective position location determinations of the power equipment device generated by the positioning module at respective times of the plurality of activations, the autonomous guidance module further configured to define subsequent paths parallel to or substantially parallel to the primary path, wherein the target position or orientation of the power equipment device is defined by a target path comprising one of: the primary path or one of the subsequent paths;
    wherein at least one of the wheel encoder module or the autonomous guidance module is positioned on a first operator armrest of the power equipment device;
    wherein the autonomous guidance module includes an output device indicating at least one of a status of definition of the primary path or the subsequent paths, or a status of activation of the manual steering mode or the autonomous steering mode; and
    wherein the autonomous guidance module includes a leftward U-turn command and a rightward U-turn command, causing the power equipment device to respectively change the target path to an adjacent path of the primary path or the subsequent paths in a left-side orientation or a right-side orientation to the target path, wherein one or more U-turns are performed utilizing three-state auto-turn steering comprising at least a first stage moderate-radius constant turn, a second stage zero-radius turn, and a third stage auto-turn in response to the leftward U-turn command or the rightward U-turn command.

2. The power equipment device of claim 1, wherein the wheel encoder module is positioned on the first operator armrest of the power equipment device, and wherein the autonomous guidance module is positioned on a second operator armrest of the power equipment device.

3. The power equipment device of claim 1, wherein the third stage auto-turn is implemented by utilizing an algorithm for generating steering adjustment data to align a current heading of the power equipment device with a target heading or the target path.

4. The power equipment device of claim 2, wherein the first operator armrest of the power equipment device is a left-side operator armrest of the power equipment device, and wherein the second operator armrest of the power equipment device is a right-side operator armrest of the power equipment device.

5. The power equipment device of claim 2, wherein the first operator armrest is movable from a first rest position to a second rest position, wherein the first rest position is an open position away from an operator position on the power equipment device, and the second rest position is a closed position close to the operator position on the power equipment device.

6. The power equipment device of claim 5, further comprising an operator adjustment configured to adjust a first location of the first rest position, or to adjust a second location of the second rest position.

7. The power equipment device of claim 1, wherein the wheel encoder module comprises a jog wheel having a rotational tension that is independent of a mechanical tension of the steering apparatus of the power equipment device.

8. The power equipment device of claim 1, wherein the output device further indicates a status of GPS acquisition.

9. The power equipment device of claim 1, wherein the one or more user input devices of the autonomous guidance module include a power takeoff (PTO) activation/deactivation input device that engages/disengages a PTO unit of the power equipment device.

10. The power equipment device of claim 1, wherein the one or more user input devices of the autonomous guidance module include a deck transport input device causing a mechanical control unit of the power equipment device to disengage a mower deck of the power equipment device in response to activation of the deck transport input device.

11. The power equipment device of claim 1, wherein the autonomous guidance module comprises a formed surface component and a control panel component.

12. The power equipment device of claim 1, wherein the leftward U-turn command comprises a leftward U-turn command button, and wherein the rightward U-turn command comprises a rightward U-turn command button.

13. A power equipment device, comprising:
- a steering apparatus including one or more electric motors configured to change an orientation of the power equipment device on a surface in response to a direction change signal;
- a steering control unit for generating and outputting values for the direction change signal to implement the change in the orientation of the power equipment device;
- an operator activated manual steering mode causing the steering control unit to receive a first steering control signal generated responsive to a rotation of a wheel encoder module, wherein the steering control unit stores a calibration between the direction change signal and the first steering control signal enabling manual steering of the power equipment device in response to the rotation of the wheel encoder module;
- an operator activated autonomous steering mode causing the steering control unit to calculate a second steering control signal in response to comparing a current position or orientation of the power equipment device generated by a positioning module relative to a target position or orientation of the power equipment device;
- an autonomous guidance module comprising one or more user input devices and configured to define a primary path in response to a plurality of activations of the one or more user input devices and respective position location determinations of the power equipment device generated by the positioning module at respective times of the plurality of activations, the autonomous guidance module further configured to define subsequent paths parallel to or substantially parallel to the primary path, wherein the target position or orientation of the power equipment device is defined by a target path comprising one of: the primary path or one of the subsequent paths;
- wherein the wheel encoder module is positioned on a first operator armrest of the power equipment device, and wherein the autonomous guidance module is positioned on a second operator armrest of the power equipment device;
- wherein the autonomous guidance module includes a leftward U-turn command and a rightward U-turn command, causing the power equipment device to respectively change the target path to an adjacent path of the primary path or the subsequent paths in a left-side orientation or a right-side orientation to the target path, wherein one or more U-turns are performed utilizing three-state auto-turn steering comprising at least a first stage moderate-radius constant turn, a second stage zero-radius turn, and a third stage auto-turn in response to the leftward U-turn command or the rightward U-turn command.

\* \* \* \* \*